United States Patent
Liu et al.

(10) Patent No.: US 10,829,113 B2
(45) Date of Patent: Nov. 10, 2020

(54) VEHICLE COLLISION AVOIDANCE

(71) Applicant: Ford Global Technologies, LLC, Dearborn, MI (US)

(72) Inventors: Nanjun Liu, Tomball, TX (US); Alex Maurice Miller, Canton, MI (US); Yuhao Liu, Canton, MI (US); Christopher Pontisakos, Allen Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 192 days.

(21) Appl. No.: 16/133,252

(22) Filed: Sep. 17, 2018

(65) Prior Publication Data

US 2020/0086854 A1 Mar. 19, 2020

(51) Int. Cl.
*B60W 30/09* (2012.01)
*B60W 30/095* (2012.01)
*G08G 1/16* (2006.01)

(52) U.S. Cl.
CPC ........ *B60W 30/09* (2013.01); *B60W 30/0953* (2013.01); *B60W 30/0956* (2013.01); *G08G 1/166* (2013.01); *B60W 2554/801* (2020.02); *B60W 2554/804* (2020.02); *B60W 2754/30* (2020.02)

(58) Field of Classification Search
CPC ..... B60W 2554/801; B60W 2554/804; B60W 2754/30; B60W 30/09; B60W 30/0953; B60W 30/0956; G08G 1/166
See application file for complete search history.

(56) References Cited

U.S. PATENT DOCUMENTS

| 6,650,983 | B1 | 11/2003 | Rao et al. | |
|---|---|---|---|---|
| 7,124,027 | B1* | 10/2006 | Ernst, Jr. | G01S 13/931 701/301 |
| 8,380,426 | B2 | 2/2013 | Konijnendijk | |
| 8,466,807 | B2 | 6/2013 | Mudalige | |
| 8,577,550 | B2 | 11/2013 | Lu et al. | |
| 8,706,393 | B2 | 4/2014 | Miller et al. | |
| 2009/0143951 | A1* | 6/2009 | Takahashi | B60T 7/22 701/70 |
| 2009/0192710 | A1* | 7/2009 | Eidehall | B62D 15/0265 701/301 |
| 2014/0136044 | A1* | 5/2014 | Conrad | G01S 13/931 701/23 |
| 2014/0347207 | A1 | 11/2014 | Zeng et al. | |
| 2015/0210280 | A1* | 7/2015 | Agnew | B60W 30/095 701/48 |
| 2016/0121887 | A1* | 5/2016 | Jeon | B60W 30/0956 701/301 |
| 2016/0144859 | A1* | 5/2016 | Yoo | B60W 30/0956 701/25 |

(Continued)

FOREIGN PATENT DOCUMENTS

| EP | 2208654 B1 | 6/2013 |
|---|---|---|
| JP | 2005173703 A | 6/2005 |
| JP | 2014006609 A | 1/2014 |

*Primary Examiner* — Babar Sarwar
(74) *Attorney, Agent, or Firm* — Frank A. MacKenzie; Bejin Bieneman PLC

(57) ABSTRACT

In a host vehicle a threat number is determined for a target vehicle based on respective dimensions of the target and host vehicles, and a heading angle of the host vehicle. A host vehicle subsystem is actuated based on the threat number.

12 Claims, 12 Drawing Sheets

(56) References Cited

U.S. PATENT DOCUMENTS

2016/0368492 A1* 12/2016 Al-Stouhi .............. G08G 1/162
2018/0015918 A1*  1/2018 Bae ....................... B60W 30/09
2018/0151073 A1*  5/2018 Minemura ................ B60T 7/22
2018/0162392 A1   6/2018 Takaki

* cited by examiner

VEHICLE COLLISION AVOIDANCE

BACKGROUND

Vehicle collisions often occur at intersections. Collision avoidance systems can use sensors to detect a target that can collide with a host vehicle in the intersection. Sensor data providing a target object position and velocity can be used to determine a probability of a collision with the host vehicle.

DETAILED DESCRIPTION

Figure 1:
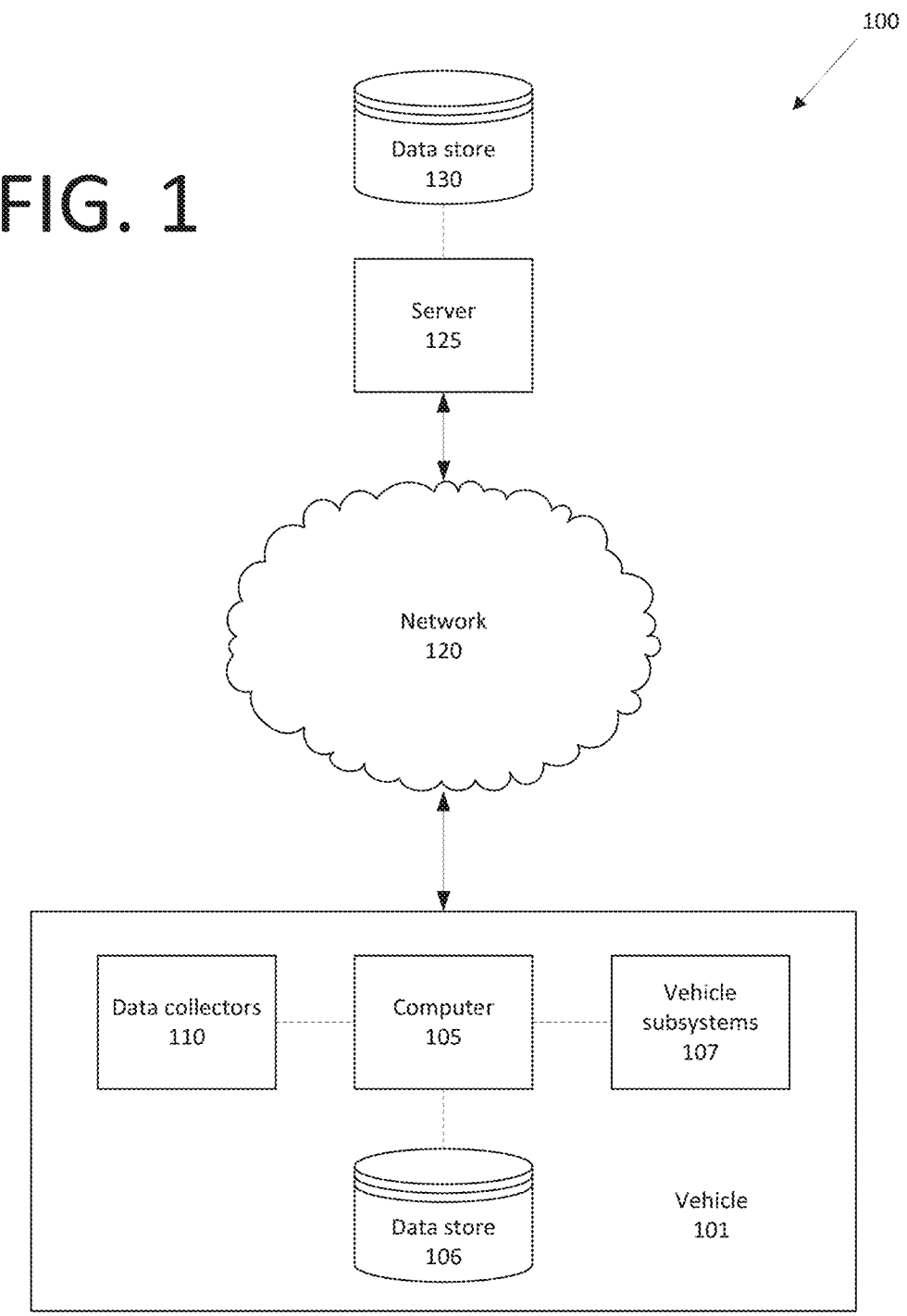
FIG. 1 is a block diagram of an example collision avoidance system.

A method comprises determining, in a host vehicle, a threat number for a target vehicle based on respective dimensions of the target and host vehicles, and a heading angle of the host vehicle; and actuating a host vehicle subsystem based on the threat number. The method can further comprise determining the threat number based on a heading angle of the target. The threat number can be based on at least one of an acceleration threat number or a steering threat number. The threat number can be a minimum of the acceleration threat number and the steering threat number. The method can further comprise determining, for a specified future time, one or both of a predicted longitudinal distance between the host vehicle and the target vehicle and a predicted lateral distance between the host vehicle and the target vehicle. The specified future time can be a time when the host vehicle and the target vehicle are predicted to collide. The specified future time can be based on a predicted time to reach a collision zone or a predicted time to clear a collision zone. Actuating the host vehicle subsystem can be further based on a specified distance margin. The vehicle subsystem can include one or more of a brake subsystem, a steering subsystem, and a propulsion subsystem.

A system, comprises a computer that includes a processor and a memory, the memory storing instructions such that the processor is programmed to: determine, in a host vehicle, a threat number for a target vehicle based on respective dimensions of the target and host vehicles, and a heading angle of the host vehicle; and actuate a host vehicle subsystem based on the threat number. The instructions can further comprise to determine the threat number based on a heading angle of the target. The threat number can be based on at least one of an acceleration threat number or a steering threat number. The threat number can be a minimum of the acceleration threat number and the steering threat number. The instructions can further comprise to determine, for a specified future time, one or both of a predicted longitudinal distance between the host vehicle and the target vehicle and a predicted lateral distance between the host vehicle and the target vehicle. The specified future time can be a time when the host vehicle and the target vehicle are predicted to collide. The specified future time can be based on a predicted time to reach a collision zone or a predicted time to clear a collision zone. Actuating the host vehicle subsystem can be further based on a specified distance margin. The vehicle subsystem can include one or more of a brake subsystem, a steering subsystem, and a propulsion subsystem.

System Overview

A computer in a host vehicle can identify one or more target vehicles and assess a threat of collision between the host and target vehicles. Based on the assessed threat, the computer can determine whether performing an intervention to change deceleration of the host vehicle can avoid a collision, and/or can notify a vehicle occupant or user of a recommended action, i.e., braking, steering, and/or accelerating, to avoid a collision. The computer is programmed to assess the threat of collision between host and target vehicles based on predicted lateral and longitudinal distances between the vehicles according to data including respective lengths, widths, and headings of host and target vehicles. Advantageously, a precise evaluation of a possible collision can be provided, and intervention or action to avoid the collision can be minimal, i.e., can include slowing, decelerating, or accelerating the host vehicle and/or steering the host vehicle to safely pass the target vehicle.

FIG. 1 illustrates a vehicle system 100 that includes a host vehicle 101 that can be in communication with a wide area network 120. A computer 105 in the vehicle 101 is programmed to receive data from one or more data collectors 110, e.g., vehicle 101 sensors. For example, vehicle 101 data may include a location of the vehicle 101, a location of a target vehicle 201, etc. Location data may be in a conventional form, e.g., Cartesian or polar coordinates, a coordinate system having, for example, an origin at a point in or on the host vehicle 101. Further examples of data available to the vehicle computer 110 via a vehicle 101 communications bus or other vehicle 101 network, e.g., a CAN bus, just to name a few, include measurements of vehicle 101 a vehicle 101 velocity, —acceleration, steering angle, etc.

The computer 105 is generally programmed for communications on a vehicle 101 network or communications bus, as is known. Via the network, bus, and/or other wired or wireless mechanisms (e.g., a wired or wireless local area network in the vehicle 101), the computer 105 may transmit messages to various devices in a vehicle 101 and/or receive messages from the various devices, e.g., controllers, actuators, sensors, etc., including data collectors 110. Alternatively or additionally, in cases where the computer 105 actually comprises multiple devices, the vehicle network or bus may be used for communications between devices represented as the computer 105 in this disclosure. In addition, the computer 105 may be programmed for communicating with the network 120, which, as described below, may include various wired and/or wireless networking technologies, e.g., cellular, Bluetooth®, wired and/or wireless packet networks, etc.

The data store 106 may be of any known type, e.g., hard disk drives, solid state drives, servers, or any volatile or non-volatile media. The data store 106 may store the collected data sent from the data collectors 110.

The vehicle 101 may include a plurality of subsystems 107. The subsystems 107 control vehicle 101 components, e.g., a vehicle seat, mirror, tiltable and/or telescoping steering wheel, etc. The subsystems 107 include, e.g., a steering subsystem, a propulsion subsystem, a brake subsystem, etc. The computer 105 may actuate the subsystems 107 to control the vehicle 101 components, e.g., to stop the vehicle 101, to accelerate the vehicle 101, to steer the vehicle 101, so as to avoid targets, etc. For example, the computer 105 may actuate the brake subsystem 107 to apply the brake to hold the vehicle 101, and in response, the brake subsystem 107 brakes and/or slows the vehicle 101.

Data collectors 110 may include a variety of devices. Data collectors 110 may include sensors internal to the vehicle 101, such as accelerometers, temperature sensors, motion detectors, etc., to detect motion or other conditions of the vehicle 101 and hence reference is made herein to sensors 110. Further, various controllers in the host vehicle 101 may operate as data collectors 110 to provide data via the vehicle 101 network or bus, e.g., data relating to vehicle speed, acceleration, position, dimensions, system and/or component status, etc. As another example, the host vehicle 101 may store data such as a predetermined maximum longitudinal acceleration value, a predetermined maximum longitudinal deceleration value, and a predetermined maximum lateral acceleration value via a vehicle 101 network, e.g., a communications bus. Sensors or the like, such as global positioning system (GPS) equipment, etc., could be included in the host vehicle 101 and configured as data collectors 110 to provide data directly to the computer 105, e.g., via a wired or wireless connection or other vehicle 101 network.

Data collectors 110 could also include sensors or the like for detecting conditions outside the host vehicle 101, e.g., medium-range and long-range sensors. For example, sensor data collectors 110 could include mechanisms such as radar, LIDAR, sonar, cameras or other image capture devices, that could be deployed to detect stationary and/or moving objects, including other vehicles, detect a speed, a direction and/or dimensions of an object such as another vehicle, measure a distance between the vehicle 101 and an object, and/or detect road conditions, such as curves, potholes, dips, bumps, changes in road grade, etc.

A vehicle computer 105 could further receive data from a second vehicle, e.g., via a vehicle-to-vehicle (V2V) communication such as Dedicated Short Range Communications (DSRC) service, via a network 120, and/or via other suitable mechanisms. The data received from the second vehicle may include a location, a desired destination, a speed, a direction, and dimensions of the second vehicle. Additionally, data collectors could receive data from a remote server 125, e.g., via a network 120.

Collected data may include a variety of data collected in a vehicle 101. Examples of collected data are provided above, and moreover, data are generally collected using one or more data collectors 110, and may additionally include data calculated therefrom in the computer 105, and/or at the server 125. In general, collected data may include any data that may be gathered by the data collectors 110 and/or computed from such data.

The network 120 can provide communications with the server 125 and/or a data store 130. The network 120 represents one or more mechanisms by which a vehicle computer 105 may communicate with a remote server 125. Accordingly, the network 120 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, IEEE 802.11, etc.), local area networks (LAN) and/or wide area networks (WAN), including the Internet, providing data communication services. The computer 105 may further be programmed to communicate with one or more remote sites such as the server 125, via a network 120, such remote sites possibly including a data store 130.

Host and Target Vehicles

Figure 2A:
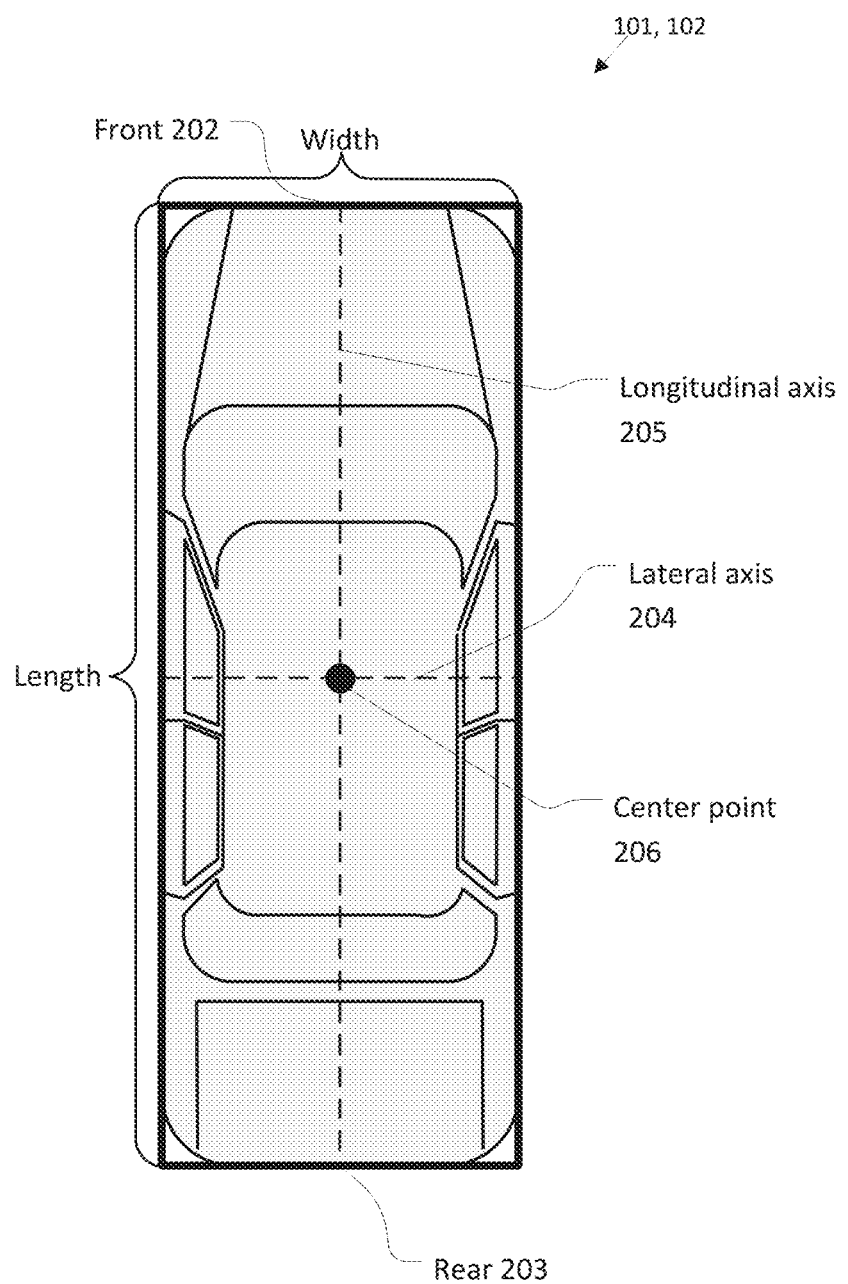
FIG. 2A illustrates geometric descriptions of vehicles that are used herein.
Figure 2B:
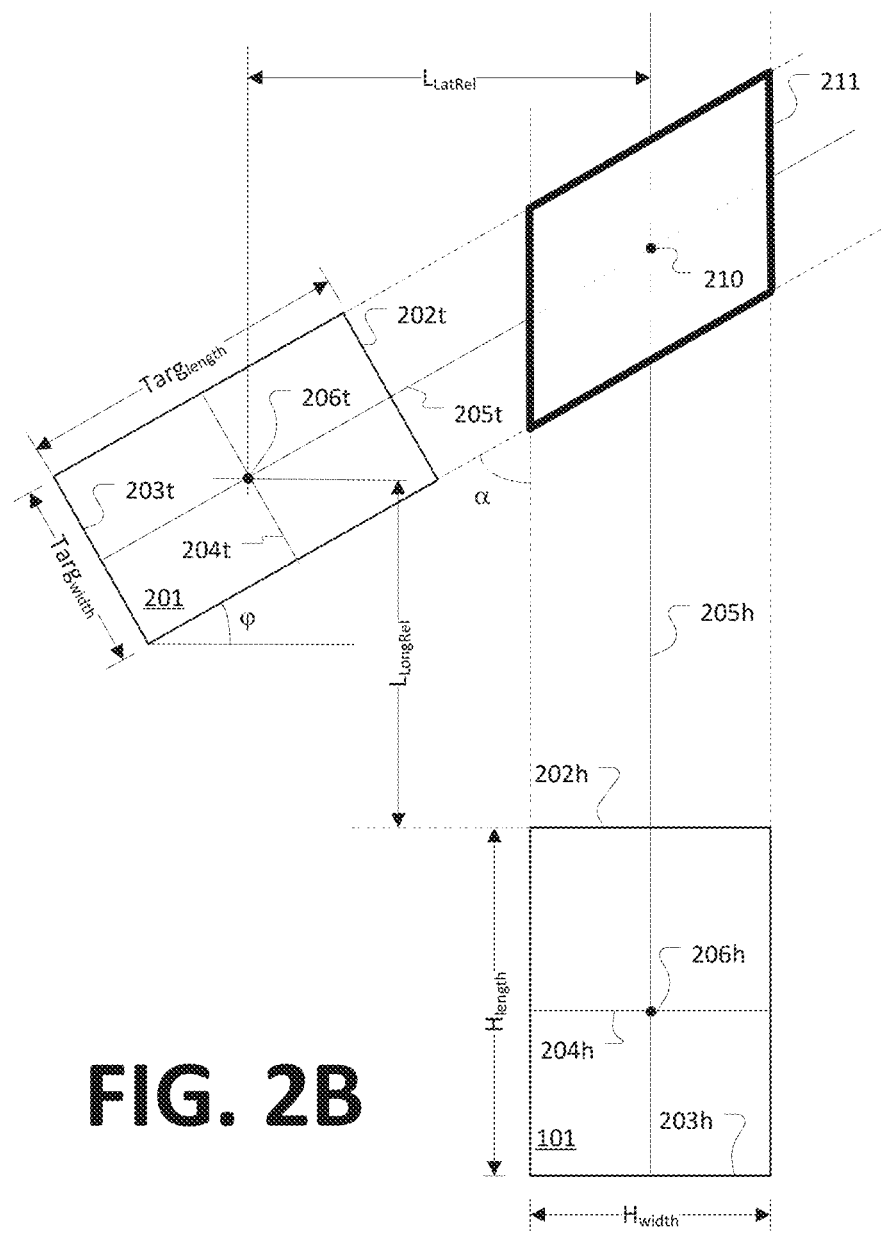
FIG. 2B illustrates the geometric descriptions of vehicles of FIG. 2B and illustrates further geometry described herein relating to identifying and/or avoiding potential collisions between a host vehicle and a target.

FIG. 2A illustrates geometric descriptions of vehicles 101, 201 that are used herein, and FIG. 2B illustrates an example intersection between a host vehicle 101 and a target vehicle 201. A target vehicle 201 is an object identified by a computer 105 in a host vehicle 101 by data from sensors 110, typically an object that the computer 105 evaluates for a collision risk. The target vehicle 201 may be another moving object. For example, the target vehicle 201 may be a powered vehicle or other object, e.g., a pedestrian, a bicycle, etc. having a target vehicle 201 speed, a target vehicle 201 direction of travel, and a target vehicle 201 distance from the host vehicle 101.

Turning first to FIG. 2A, a vehicle 101, 201 is assigned a front line (or simply "front") 202 as a line parallel to a lateral axis 204 of the vehicle 101, 201, and through a forward-most point of the vehicle 101, 201 (e.g., a front-most or forward-most point or set of points on a vehicle 101, 201 bumper). A vehicle 101, 201 is assigned a rear line (or simply "rear") 203 as a line parallel to the lateral axis 204 of the vehicle 101, 201, and through a rear-most point of the vehicle 101, 201 (e.g., a rear-most point or set of points on a vehicle 101, 201 bumper). The axes 204, 205 are perpendicular to each other. A vehicle 101, 201 width is a distance from a right-most point on the vehicle 101, 201 exterior to a left-most point on the vehicle 101, 201 exterior. A vehicle 101, 201 length is a distance between the vehicle 101, 201 forward-most to rear-most points. A vehicle 101, 201 center point 206 is a point of intersection of the lateral and longitudinal axes 204, 205, assuming that the lateral axis 204 is placed to bisect the vehicle 101, 201 length, and the longitudinal axis is placed to bisect the vehicle 101, 201 width.

As used herein, a "position" or "location" of the target vehicle 201 and/or the host vehicle 101 means a point specified with reference to coordinates in a coordinate system. e.g., a set of coordinates on a predetermined X-Y-Z Cartesian grid, etc. A vehicle 101, 201 path is a set of locations or positions. An intersection 210 could be any point, specified on a ground surface such as a road surface, where vehicles 101 and target 201 paths cross or overlap, i.e., whether vehicles 101, 201 could collide. Predicted future paths of a host vehicle 101 and/or targets 201 determine a possible intersection 210. The set of possible intersections 210 is a collision zone 211. Further, a position or location of a target vehicle 102, which is a three dimensional object, with respect to a host vehicle 101 coordinate system, can be specified as a component of a vector from a host vehicle 101 front 202 center point to the target vehicle 102 center point 206.

FIG. 2B illustrates the geometric descriptions of vehicles of FIG. 2B and illustrates further geometry described herein relating to identifying and/or avoiding potential collisions between a host vehicle 101 and a target vehicle 201. In FIG.

2B lines, points and axes 202, 203, 204, 205, 206 are noted as a line, point or axis 202h, 203h, 204h, 205h, 206h, or 202t, 203t, 204t, 205t, 206t, to denote whether the respective line, point, or axis 202, 203, 204, 205, 206 is associated with, respectively, a host vehicle 101 or a target vehicle 201. Thus, references to a line, point, or axis 202, 203, 204, 205, 206 with notation with an "h" or "t" should be understood to generically apply to vehicles 101, 201, whereas a line, point, or axis 202h, 203h, 204h, 205h, 206h belongs to a host vehicle 101, and a line, point, or axis 202t, 203t, 204t, 205t, 206t belongs to a target vehicle 201.

For purposes of the discussion herein, a vehicle 101, 201 path of travel, or path, is generally assumed to be defined by travel a forward direction along a line defined by its longitudinal axis 205. Respective paths of the host vehicle 101 and the target vehicle 201 may define the intersection 210. The intersection 210, as previously mentioned, is a point at which the host vehicle 101 may collide with the target vehicle 201, i.e., the area where the path of the host vehicle 101 may intersect the path of the target vehicle 201.

The intersection 210 is located in a collision zone 211, i.e., an area around the point defining the intersection 210. The collision zone 211 defines an area in which vehicle 101, 201 paths could intersect or, put another where, an area in which vehicles 101, 102 could collide or come into contact with one another if the vehicle 101, 201 paths are in the collision zone 211. The area of the collision zone 211 is typically a parallelogram having sides parallel to respective longitudinal axes 205h, 205t of the vehicles 101, 201. For example, the zone 211 is a square or rectangle when vehicle 101, 201 longitudinal axes 205h, 205t are perpendicular to each other. If the zone 211 is a square or rectangle, then a length and width of the zone 211 are the respective vehicle 101, 201 widths $H_{width}$, $Targ_{width}$. If the axes 205h, 205t are not parallel, i.e., the zone 211 is some other parallelogram, then the parallelogram can nonetheless be determined according to the widths $H_{width}$, $Targ_{width}$. That is, a distance equal to $H_{width}$, measured by a line from, and perpendicular to, a first side of the parallelogram can define a point or points through which an opposite side of the parallelogram is define. Likewise, a distance equal to $Targ_{width}$, measured by a line from, and perpendicular to, a second side of the parallelogram adjacent to the first side, can define a point or points through which an opposite side of the parallelogram is defined.

Host vehicle 101 dimensions may be stored in the vehicle 101, e.g., in the data store 106, available over a CAN bus, etc. The data collectors 110 may provide data indicating the dimensions of a target vehicle 201. Specifically, the width $H_{width}$ and the length $H_{length}$ of the host vehicle 101 may be determined, where the width $H_{width}$ is the distance from the left of the host vehicle 101 to the right of the host vehicle 101, and the length $H_{length}$ is the distance from the front 202h of the host vehicle 101 to the rear 203r of the host vehicle 101. Similarly, the width $Targ_{width}$ and the length $Targ_{length}$ of the target vehicle 201 may be determined, where the width $Targ_{width}$ is the distance from the left of the target vehicle 201 to the right of the target vehicle 201, and the length $Targ_{length}$ is the distance from the front 202t of the target vehicle 201 to the rear of the target vehicle 201. The dimensions of both the host vehicle 101 and the target vehicle 201 can be mapped onto the X and Y axes as shown in equations (1)-(4) below.

Mathematical Parameters

Table 1 below provides an explanation of notations and mathematical parameters in various equations herein.

TABLE 1

| Notation | Meaning |
|---|---|
| α | Angle of a target vehicle 201 heading (i.e., direction of travel) relative to a longitudinal axis 205h of a host vehicle 101. |
| φ | Angle of a target vehicle 201 heading relative to a lateral axis 204h of a host vehicle 101. |
| ψ | Host vehicle 101 Heading angle |
| $\psi_{Host}(t)$ | Change Rate of heading angle |
| $L_{LongRel}(t)$ | Longitudinal distance (i.e., longitudinal component of a distance vector) between the host vehicle 101 and the target vehicle 201 at a time t (i.e., distance between the host vehicle 101 and the target vehicle 201 along the host vehicle 101 longitudinal axis 205h measured from a center point of the front 202h of the host vehicle 101 to the center 206t of the target vehicle 201. |
| $L_{longRel}(t + T)$ | Predicted longitudinal distance at time t + T between the host vehicle 101 and the target vehicle 201. |
| $L_{LatRel}(t)$ | Lateral distance at a time t between the host vehicle 101 and the target vehicle 201, i.e., distance between the host vehicle 101 longitudinal axis 205h and the target vehicle 201 center 206t. |
| $L_{LatRel}(t + T)$ | Predicted lateral distance at time t + T between the host vehicle 101 and the target vehicle 201. |
| $a_{LongHost}(t)$ | Acceleration of the host vehicle 101 along, i.e., in a direction defined by, its longitudinal axis 205h at a time t. |
| $a_{LongTrgt}(t)$ | Acceleration of the target vehicle 201 along, i.e., in a direction defined by, the host vehicle 101 longitudinal axis 205h at a time t. |
| $a_{LatHost}(t)$ | Acceleration of the host vehicle 101 along, i.e., in a direction defined by, its lateral axis 204h at a time t. |
| $a_{LatTrgt}(t)$ | Acceleration of the target vehicle 201 along, i.e., in a direction defined by, the host vehicle 101 lateral axis 204h at a time t. |
| $v_{LongHost}(t)$ | Speed of the host vehicle 101 along, i.e., in a direction defined by, its longitudinal axis 205h. |
| $v_{LongTrgt}(t)$ | Speed of the target vehicle 201 along, i.e., in a direction defined by, the host vehicle 101 longitudinal axis 205t at a time t. |
| $v_{LatHost}(t)$ | Speed of the host vehicle 101 along, i.e., in a direction defined by, its lateral axis 204h at a time t. |
| $v_{LatTrgt}(t)$ | Speed of the target vehicle 201 along, i.e., in a direction defined by, the host vehicle 101 lateral axis 204t at a time t. |
| $T_{ClearLon}$ | Time predicted to elapse from a present time tat which the target vehicle 201 is predicted to clear, i.e., travel past the collision zone 211 without intersection, the host vehicle 101 longitudinal axis 205h. |

TABLE 1-continued

| Notation | Meaning |
|---|---|
| $T_{ReachLon}$ | Time predicted to elapse from a present time tat which the target vehicle 201 is predicted to reach, i.e., cross or intersect with, host vehicle 101 longitudinal axis 205h. |
| $T_{ClearLat}$ | Time predicted to elapse from a present time tat which the target vehicle 201 is predicted to clear, i.e., travel past the collision zone 211 without intersecting, the path of the host vehicle 101 along the host vehicle 101's lateral axis 204h. |
| $T_{ReachLat}$ | Time predicted to elapse from a present time tat which the target vehicle 201 is predicted to reach, i.e., cross or intersect with, the path of the target vehicle 201 along the host vehicle 101's lateral axis 204h. |
| $a_{MaxAccelHost}$ | Maximum achievable longitudinal acceleration by host vehicle 101. The maximum achievable longitudinal acceleration may be a manufacturer-specified value and/or determined based on the dimensions and specification of the host vehicle 101, e.g., the host vehicle 101 mass, the maximum torque of the vehicle transmission torque converter, an initial torque of an electrical motor in a propulsion subsystem, etc. |
| $a_{MaxDecelHost}$ | Maximum achievable longitudinal deceleration by host vehicle 101. The maximum achievable longitudinal deceleration may be a manufacturer-specified value and/or determined based on the dimensions and specification of the host vehicle 101, e.g., the host vehicle 101 mass, the maximum torque of the vehicle transmission torque converter, an initial torque of an electrical motor in a propulsion subsystem, etc. |
| $a_{MaxLatHost}$ | Maximum achievable lateral acceleration by host vehicle 101. The maximum achievable lateral acceleration may be a manufacturer-specified value and/or determined based on the dimensions and specification of the host vehicle 101, e.g., the host vehicle 101 mass, the maximum torque of the vehicle transmission torque converter, an initial torque of an electrical motor in a propulsion subsystem, etc. |
| ATN | An acceleration threat number (defined below) for a host vehicle 101. |
| BTN | A brake threat number (defined below) for the host vehicle 101. |
| $H_{length}$ | Length of the host vehicle 101 |
| $H_{width}$ | Width of the host vehicle 101 |
| $H_{dimensions}(X)$ | See equation (1) below. |
| $H_{dimensions}(Y)$ | See equation (2) below. |
| $Targ_{length}$ | Length of the target vehicle 201 |
| $Targ_{width}$ | Width of the target vehicle 201 |
| $Targ_{dimensions}(X)$ | See equation (3) below. |
| $Targ_{dimensions}(Y)$ | See equation (4) below. |
| $ST\ N_{Front}$ | Steering Threat Number (as defined below) for the host vehicle 101, where the host vehicle 101 steers around the front 202t of the target vehicle 201 |
| $ST\ N_{Rear}$ | Steering Threat Number (as defined below) for the host vehicle 101, where the host vehicle 101 steers around the rear end of the target vehicle 201. |

In general, systems and methods discussed herein determine whether vehicles 101, 201 will clear a collision zone 211 without colliding by predicting a lateral and longitudinal distance, e.g., at a specified time t, between vehicles 101, 201 as the vehicles 101, 201 move through the collision zone 211. That is, the computer 105 can compare a predicted lateral or longitudinal distance between vehicle 101, 102, with respective lengths and widths of the vehicles 101, 102 in different scenarios to determine whether the vehicles 101, 102 are predicted to avoid a collision. For example, if the distance $L_{LatRel}$ (t+T) at a time t+T at which the vehicles 101, 201 are both in the intersection exceeds the clearance lateral distance $L_{LatClear}$, then it can be determined that the vehicles 101, 201 will clear the collision zone 211 without collision. Further for example, L if $L_{LatRel}$(t+T)<$L_{LatClear}$, then the computer 105 may execute programming to perform an intervention and/or output to a vehicle human machine interface (HMI) a recommendation to take evasive action, i.e., steering, braking, and/or accelerating.

An intervention or evasive action means that the host vehicle 101 modifies or changes its path to avoid a collision, e.g., increasing a host vehicle 101 longitudinal speed to travel through the intersection 210 before the target vehicle 201 travels through the intersection 210, reducing the host vehicle 101 longitudinal speed to allow the target vehicle 201 to travel through the collision zone 211 before the host vehicle 101 travels through the collision zone 211. For example, the computer 105 can execute programming to increase the host vehicle 101 lateral speed (e.g., by allowing a user to manually steer the vehicle 101 before implementing braking) toward a front 202t of the target vehicle 201 to travel past a location in the target vehicle 201 path before the target vehicle 201 travels through the collision zone 211, or increasing the host vehicle 101 lateral speed toward a rear 203t of the target vehicle 201 to travel through collision zone 211 after the target vehicle 201 has travelled through the collision zone 211.

Referring again to FIG. 2B, the lateral distance $L_{LatRel}$ for two vehicles 101, 201 to clear the collision zone 211 without colliding with another is given by:

$$L_{LatRel} = \frac{1}{2}(H_{width} + Targ_{width}\cos\alpha + Targ_{length}\sin\alpha). \quad (1)$$

To simplify further equations and the discussion in this disclosure, we will address a special case in which that the relative heading angle α between the vehicles 101, 201, i.e., between the longitudinal axes 205h, 205t, is a right angle, i.e., 90°. Because the cosine of a right angle is zero, and the sine of the right angle is one, equation (1) can be simplified to $$L_{LatRel} = \frac{1}{2}(H_{width} + Targ_{length}). \quad (2)$$

However, it is to be understood that in all that follows cases where $\alpha \neq 90°$ are addressed by complexifying calculations to account for trigonometric values for the heading angle $\alpha$ between the host and target vehicles 101, 201. Further, equations herein generally assume a constant turn rate and acceleration for the host vehicle 101, and moreover do not rely on curvature estimation for the target vehicle 201, but rather assume a constant acceleration and substantially straight path. For example, it is generally assumed herein, for ease of description, that $a_{LatHost}=0$ and $v_{LatHost}=0$. The methodology is flexible enough to use alternative motion models which can rely on different assumptions.

Equations (3) and (4) provide examples of how lateral and longitudinal distances, respectively, between host and target vehicles 101, 201, can be predicted. The values for $a_{LongHost}(t)$, $\dot{\psi}_{Host}(t)$, $v_{LongHost}(t)$, $a_{LatTrgt}(t)$, $a_{LongTrgt}(t)$, $v_{LatTrgt}(t)$, $v_{LongTrgt}(t)$, $L_{LongRel}(t)$, and $L_{LatRel}(t)$ are typically determined for a time t from data from host vehicle 101 sensors. Thus, the determinations made by the following equations are made at a current time t for a future time t+T.

$$L_{LatRel}(t+T) = -\frac{1}{24}v_{LongHost}(t)\dot{\psi}_{Host}^3(t)*T^4 + \quad (3)$$
$$\frac{1}{3}a_{LongHost}(t)\dot{\psi}_{Host}(t)*T^3 +$$
$$\frac{1}{2}(v_{LongHost}(t)\dot{\psi}_{Host}(t) + a_{LatTrgt}(t) - a_{LatHost}(t))*T^2 +$$
$$(v_{LatTrgt}(t) - v_{LatHost}(t))*T + L_{LatRel}(t)$$

$$L_{longRel}(t+T) = \frac{1}{8}a_{LongHost}(t)\dot{\psi}_{Host}(t)^2*T^4 + \quad (4)$$
$$\frac{1}{6}v_{LongHost}(t)\dot{\psi}_{Host}(t)^2*T^3 + \frac{1}{2}(a_{LongTrgt}(t) - a_{LongHost}(t))*T^2 +$$
$$(v_{LongTrgt}(t) - v_{LongHost}(t))*T + L_{LongRel}(t)$$

Using the above, and further equations as described below, the computer 105 can identify a collision threat, e.g., whether intervention or evasive action by a user is needed. For example, various interventions or evasive actions that could be specified are described next.

Threat Numbers

A threat number TN is a numeric value that provides a relative likelihood of a collision between a host vehicle 101 and a target vehicle 201. For example, a threat number of zero could indicate no risk of collision between vehicles 101, 201, whereas a threat number greater than zero could indicate some risk of collision, the risk being greater the greater the threat number. A general threat number TN can be based on one or more constituent threat numbers, including an Acceleration Threat Number ATN and a Steering Threat Number STN. As disclosed herein, a vehicle 101 computer 105 can be programmed to calculate an Acceleration Threat Number as a longitudinal acceleration (which can be positive or negative, and therefore ATN can also be thought of as representing acceleration or deceleration) to allow the host vehicle 101 to pass ahead of or behind the target vehicle 201. Further, the computer 105 can be programmed to calculate a Steering Threat Number as a lateral acceleration according to which the vehicle 101 can be steered, i.e., to the left or right, to allow the host vehicle 101 to pass ahead of or behind the target vehicle 201.

In the examples discussed below, the computer 105 is programmed to compute ATN and STN to be at most a value of 1. The general threat number TN can then be selected as the minimum of the ATN and STN. If the threat number TN is one, then typically this means that a minimum intervention or action as disclosed herein cannot be performed, and some other intervention or action is needed. However, if one or both of ATN and STN are less than one, then the lesser of ATN and STN can be selected to provide a minimal collision avoidance intervention to provide safe operation of a vehicle 101 with minimal discomfort and disturbance to occupants.

Example Interventions or Evasive Actions

Example interventions or evasive actions (referred to collectively in this section as "interventions") are described below. As explained above, an intervention can be performed according to a threat number that specified a basis for the computer 105 or a user to actuate vehicle 101 components to change acceleration and/or a steering angle. It should be noted that the interventions described below provide for a host vehicle 101 to change acceleration to avoid a collision zone 211 with no margin, i.e., no distance between the vehicles 101, 201 as they pass by each other, even if a collision is avoided. Thus, it is to be understood that in the implementation of threat numbers as described below, the computer 105 is preferably further be programmed to provide a margin or distance between vehicles in addition to a distance attained by actuating the vehicle according to a determined threat number. The additional distance or margin could be specified by programming in the computer 105, e.g., according to a distance determined through testing to allow for occupant comfort while increasing a change in steering or acceleration as little as possible.

1. Deceleration Intervention.

A first example intervention is a deceleration intervention (sometimes referred to as a braking intervention although it may or may not include application of vehicle 101 brakes), in which the computer 105 decelerates, e.g., brakes, the host vehicle 101 so that the host vehicle 101 path passes behind the target vehicle 201 rear 203t. The braking intervention is performed when the following condition is met:

$$L_{longRel}(t + T_{ClearLat}) < \frac{1}{2}Targ_{width}. \quad (5)$$

Figure 4A:
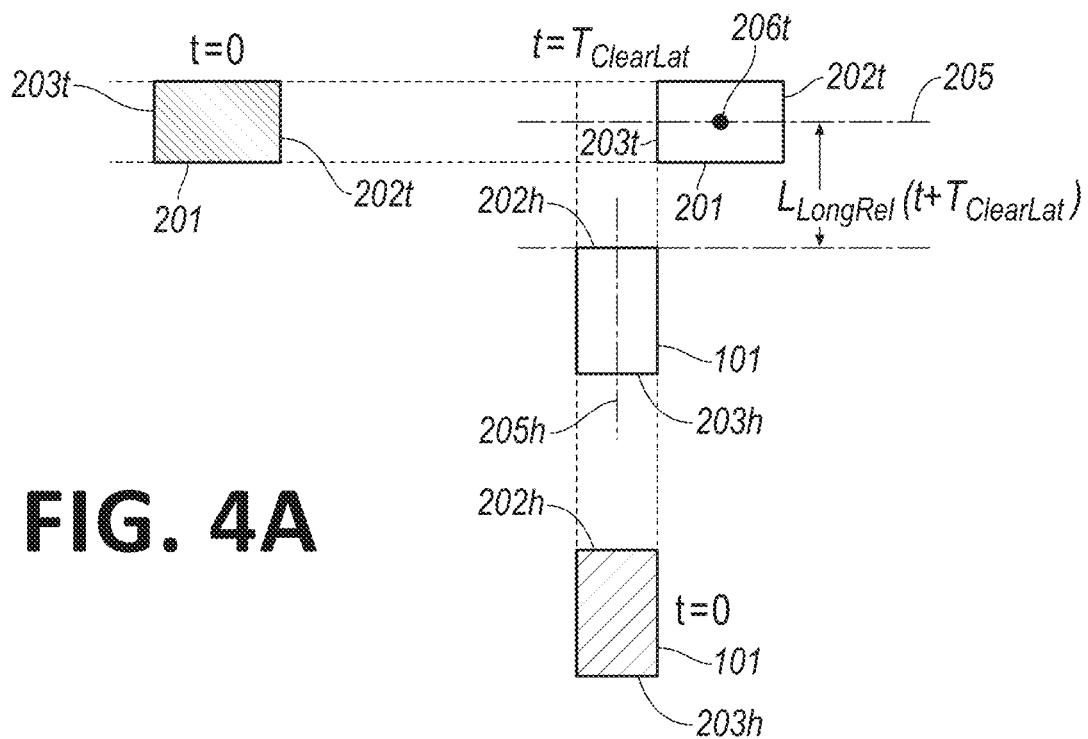
FIGS. 4A-4C illustrate the predicted positions of host and target vehicle at time to clear the host path along lateral direction.
Figure 4B:
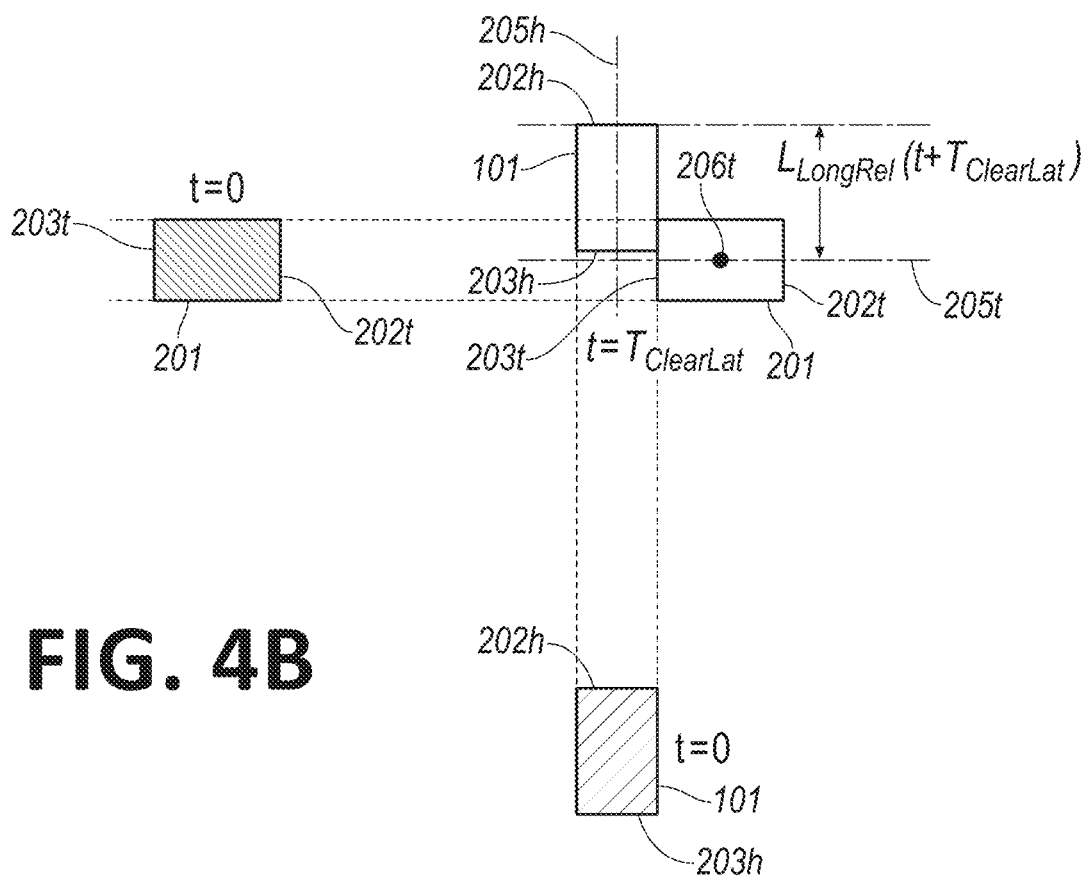

$L_{longRel}$ is given in (4) above. FIGS. 4A and 4B illustrate different scenarios, i.e., examples in which the condition of (5) is false and true, respectively, for a value for $L_{longRel}(t+T_{ClearLat})$, i.e., a longitudinal distance between vehicles 101, 201 at a time $t+T_{ClearLat}$.

Recall that (2) above specifies a value of $L_{LatRel}$ for which a collision is avoided. Therefore, the time $T_{ClearLat}$ can be determined by substituting (2) into (3), solving for the time T, and denoting the smallest positive real root of T as $T_{ClearLat}$:

$$\frac{1}{2}(H_{width} + Targ_{length}) = -\frac{1}{24}v_{LongHost}(t)\dot{\psi}_{Host}^3(t)*T^4 + \quad (6)$$
$$\frac{1}{3}a_{LongHost}(t)\dot{\psi}_{Host}(t)*T^3 +$$
$$\frac{1}{2}(v_{LongHost}(t)\dot{\psi}_{Host}(t) + a_{LatTrgt}(t) - a_{LatHost}(t))*T^2 +$$
$$(v_{LatTrgt}(t) - v_{LatHost}(t))*T + L_{LatRel}(t).$$

Then, letting $T=T_{ClearLat}$ in equation (3) above, $L_{longRel}(t+T_{ClearLat})$ can be determined so that the condition set forth in (5) above can be evaluated to determine whether to perform a deceleration intervention. If a deceleration intervention is to be performed, the computer 105 can calculate deceleration needed to reduce vehicle 101 travel between a current time t and the time $T_{ClearLat}$ by a distance $$D = \frac{1}{2} Targ_{width} - L_{longRel}(t + T_{ClearLat})$$

divided by maximum achievable deceleration (which a computer 105 can conventionally determine according to a current vehicle 101 speed, a coefficient of friction, and specifications for the vehicle 101). The deceleration threat number to be applied is thus given by:

$$ATN_{decel} = \min\left(\frac{2 * \max\left(\frac{1}{2} Targ_{width} - L_{longRel}(t + T_{ClearLat}), 0\right)}{T_{ClearLat}^2} * \frac{1}{a_{MaxDecelHost}}, 1\right). \quad (7)$$

Figure 4C:
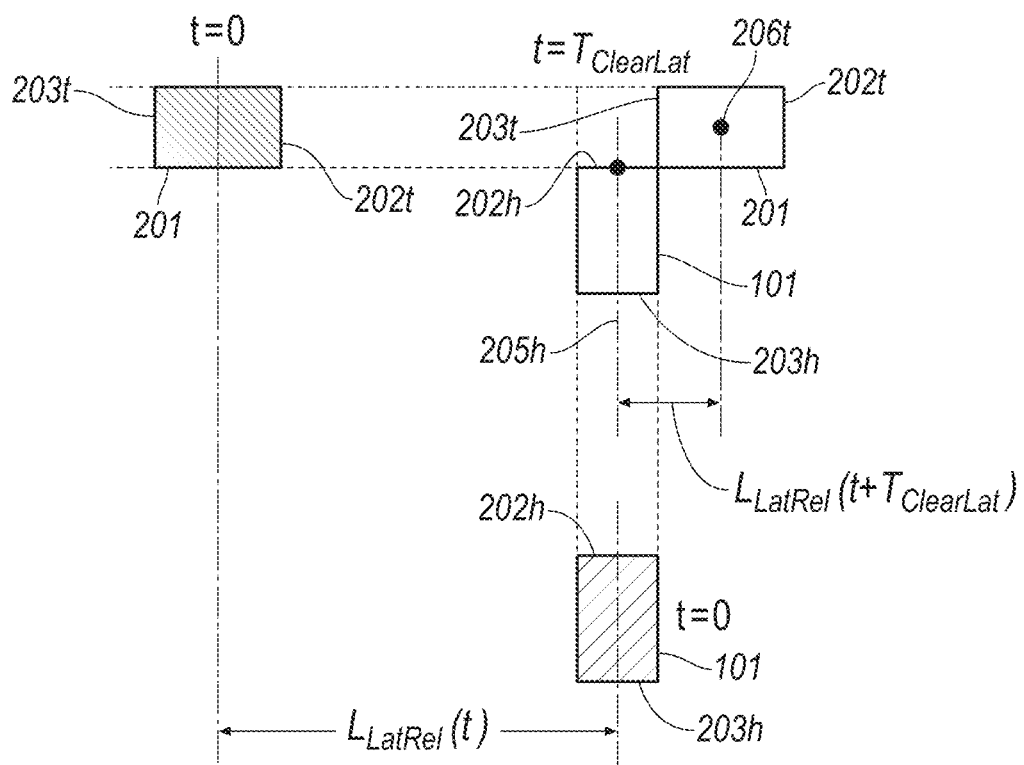

FIG. 4C illustrates respective positions of host and target vehicles 101, 102 after a deceleration intervention has been performed (and assuming an ideal calculation, i.e., without any margin or distance between the vehicles 101, 102 as they pass each other).

2. Acceleration Intervention

A second example intervention is an acceleration intervention in which the computer 105 accelerates the host vehicle 101 so that the host vehicle 101 path passes ahead of the target vehicle 201 front 202*t*. The acceleration intervention is performed when the following condition is met:

$$L_{longRel}(t + T_{ReachLat}) > -\frac{1}{2} Targ_{width} - H_{length}. \quad (8)$$

Figure 5A:
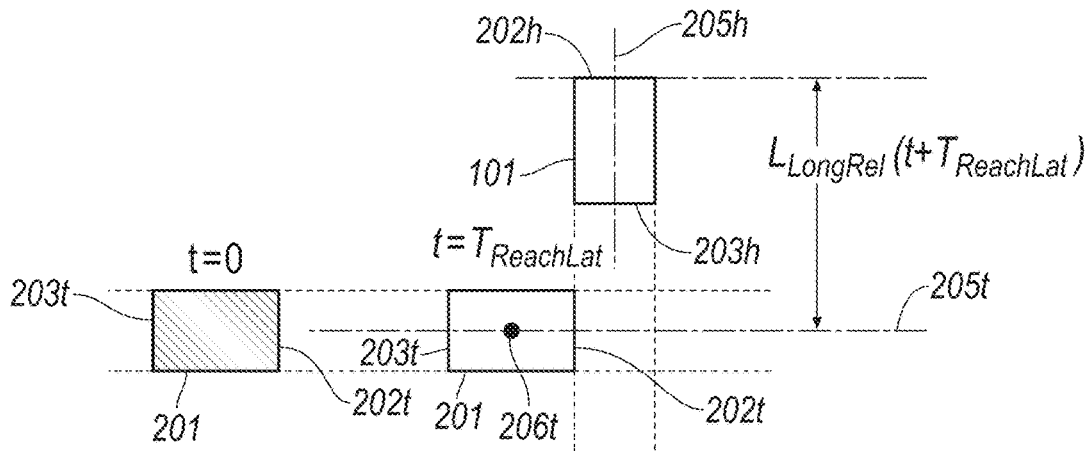
FIGS. 5A-5C illustrate the predicted positions of host and target vehicle at time to reach the host path along lateral direction
Figure 5A:
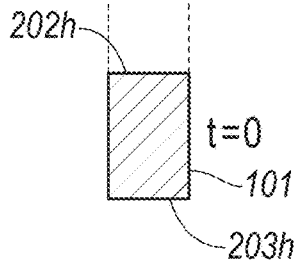
Figure 5B:
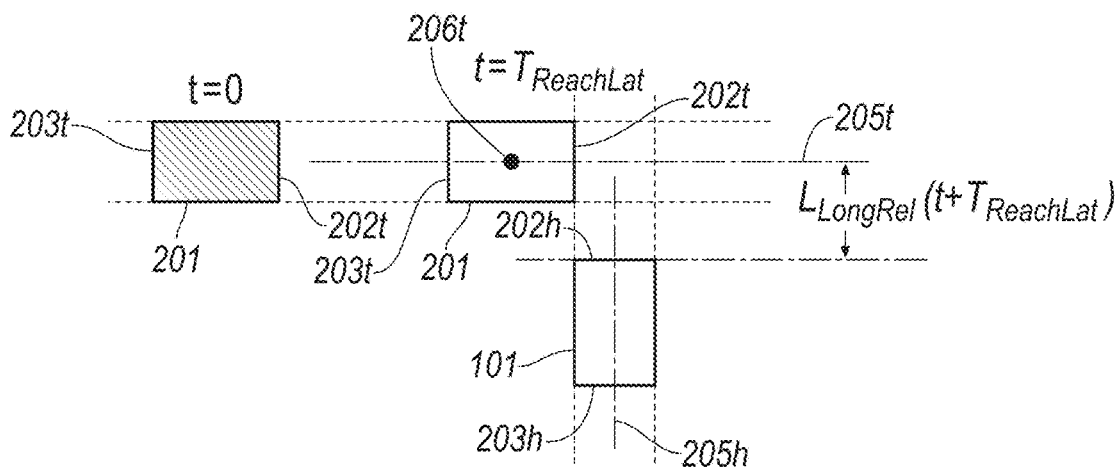
Figure 5B:
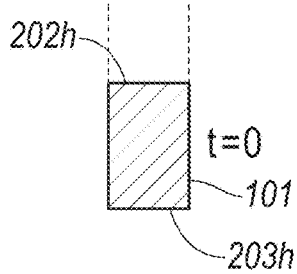

FIGS. 5A and 5B illustrate different scenarios, i.e., examples in which the condition of (8) is false and true, respectively, for a value for $L_{longRel}(t+T_{ReachLat})$, i.e., a longitudinal distance between vehicles 101, 201 at a time $t+T_{ReachLat}$.

$T_{ReachLat}$ is a time at which the target vehicle 201 is predicted to reach, i.e., cross or intersect with, the path of the target vehicle 201 along the host vehicle 101's lateral axis 204*h*. Put another way, $T_{ReachLat}$ is the time when the target vehicle 201 just reaches the path of the host vehicle 101 in the lateral direction, i.e., the relative lateral distance between target and host vehicle is as follows:

$$L_{LatRel}(t + T) = -\frac{1}{2}(H_{Width} + Targ_{Length}). \quad (9)$$

Substituting the right-hand side of (9) into (3), given above, we obtain $$-\frac{1}{2}(H_{Width} + Targ_{Length}) = -\frac{1}{24} v_{LongHost}(t) \dot{\psi}_{Host}^3(t) * T^4 + \quad (10)$$

$$\frac{1}{3} a_{LongHost}(t) \dot{\psi}_{Host}(t) * T^3 +$$

-continued $$\frac{1}{2}(v_{LongHost}(t) \dot{\psi}_{Host}(t) + a_{LatTrgt}(t) - a_{LatHost}(t)) * T^2 +$$

$$(v_{LatTrgt}(t) - v_{LatHost}(t)) * T + L_{LatRel}(t)$$

The time $T_{ReachLat}$ can be determined by denoting the smallest positive real root of T obtained from (10) as $T_{ReachLat}$. Then, letting $T=T_{ReachLat}$ in equation (4) above, $L_{longRel}(t+T_{ClearLat})$ can be determined so that the condition set forth in (8) above can be evaluated to determine whether to perform an acceleration intervention. If an acceleration intervention is to be performed, the computer 105 can calculate acceleration needed to increase vehicle 101 travel between a current time t and the time $T_{ReachLat}$ by a distance D=

$$L_{longRel}(t + T_{ReachLat}) + \frac{1}{2} T_{width} + H_{length}$$

divided by maximum achievable deceleration (which a computer 105 can conventionally determine according to a current vehicle 101 speed, a coefficient of friction, and specifications for the vehicle 101). The acceleration threat number to be applied is thus given by:

$$ATN_{accel} = \min\left(\frac{2 * \max\left(L_{longRel}(t + T_{ReachLat}) + \frac{1}{2} Targ_{width} + H_{length}, 0\right)}{T_{ReachLat}^2} * \frac{1}{a_{MaxAccelHost}}, 1\right). \quad (11)$$

Figure 5C:
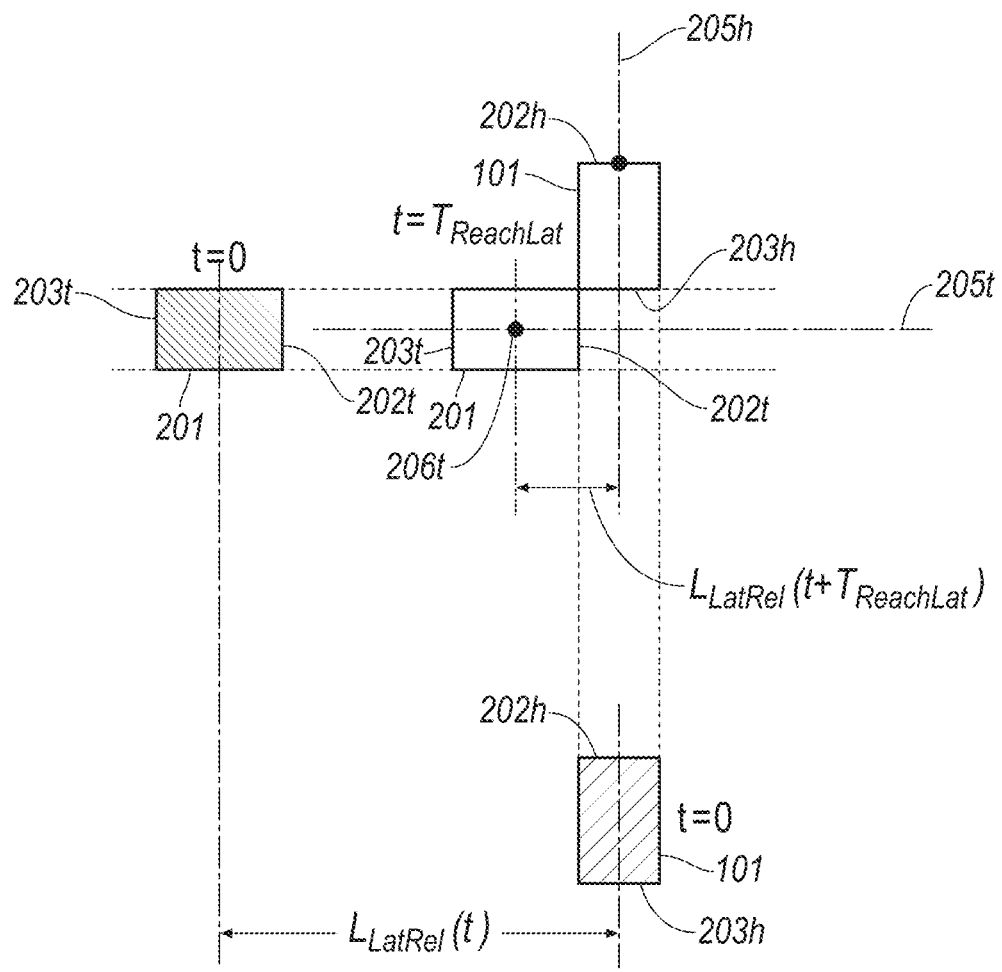

FIG. 5C illustrates respective positions of host and target vehicles 101, 102 after an acceleration intervention has been performed (and assuming an ideal calculation, i.e., without any margin or distance between the vehicles 101, 102 as they pass each other).

3. Steering-to-Rear Intervention

A second example intervention is a steering-to-rear intervention in which the computer 105 determines whether the host vehicle 101 can be steered, e.g., by a user, so that the host vehicle 101 path passes behind the target vehicle 201 rear 203*t*. The steering-to-rear intervention is performed when the following condition is met:

$$L_{LatRel}(t + T_{ReachLon}) < \frac{1}{2}(Targ_{length} + H_{width}). \quad (12)$$

Figure 6A:
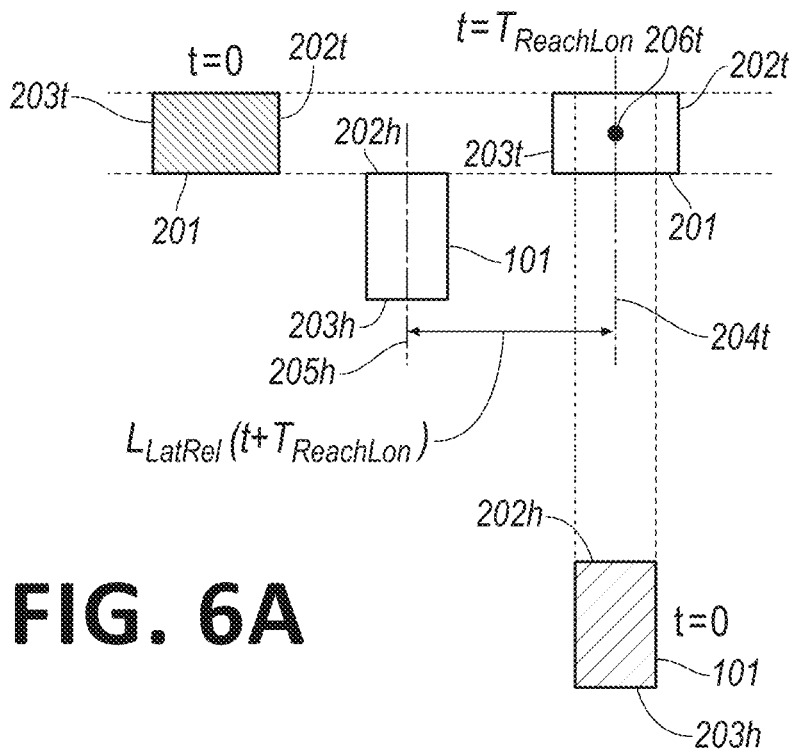
FIGS. 6A-6C illustrate the predicted positions of host and target vehicle at time to reach the host path along longitudinal direction
Figure 6B:
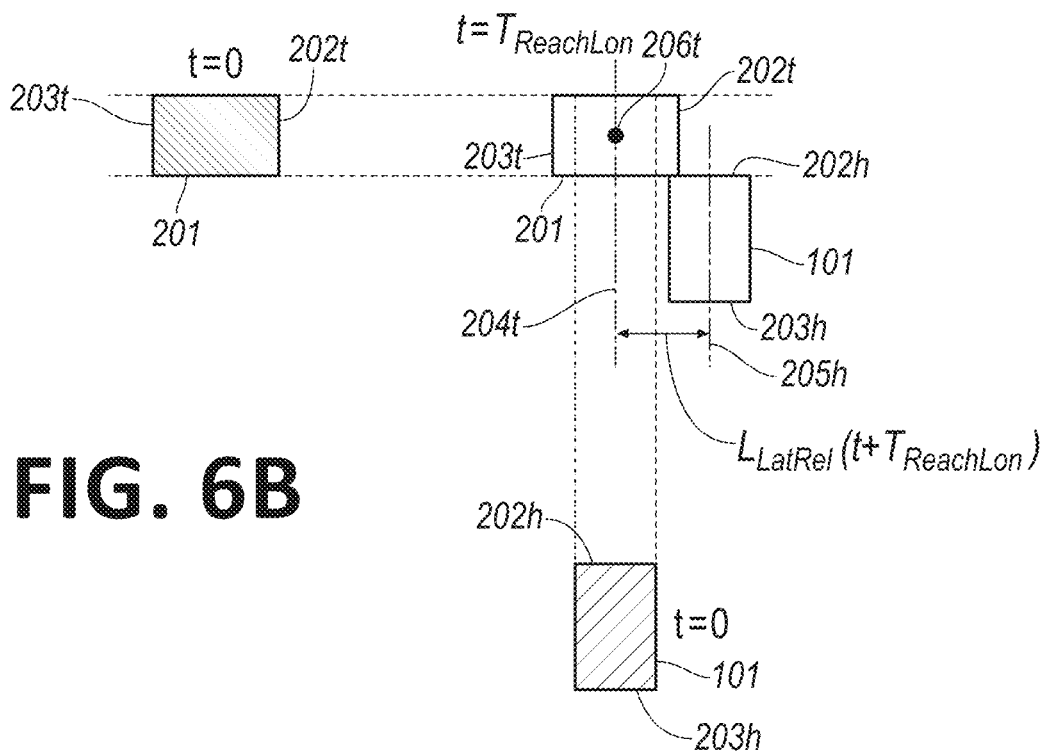

FIGS. 6A and 6B illustrate different scenarios, i.e., examples in which the condition of (12) is false and true, respectively, for a value for $L_{LatRel}(t+T_{ReachLon})$, i.e., a lateral distance between vehicles 101, 201 at a time $t+T_{ReachLon}$.

$T_{ReachLon}$ is time t at which the target vehicle 201 is predicted to reach, i.e., cross or intersect with, target vehicle 201 longitudinal axis 205*t*. Put another way, $T_{ReachLon}$ is the time when the host vehicle 101 just reaches the path of the target vehicle 201 in the longitudinal direction, i.e. the relative distance between target and host vehicles 101, 201 along the host vehicle 101 longitudinal axis 205*h* is:

$$L_{LonRel}(t+T) = \frac{1}{2} T_{width} \quad (13)$$

Substituting the right-hand side of (13) into (3), given above, we obtain $$\frac{1}{2} Targ_{width} = -\frac{1}{24} v_{LongHost}(t) \dot{\psi}_{Host}^3(t) * T^4 + \quad (14)$$

$$\frac{1}{3} a_{LongHost}(t) \dot{\psi}_{Host}(t) * T^3 +$$

$$\frac{1}{2} (v_{LongHost}(t) \dot{\psi}_{Host}(t) + a_{LatTrgt}(t) - a_{LatHost}(t)) * T^2 +$$

$$(v_{LatTrgt}(t) - v_{LatHost}(t)) * T + L_{LatRel}(t)$$

The time $T_{ReachLon}$ can be determined by denoting the smallest positive real root of T obtained from (14) as $T_{ReachLon}$. Then, letting $T=T_{ReachLon}$ in equation (3) above, $L_{latRel}(t+T_{ReachLon})$ can be determined so that the condition set forth in (12) above can be evaluated to determine whether to perform a steering-to-rear intervention. If a steering-to-rear intervention is to be performed, the computer 105 can calculate lateral acceleration needed to increase vehicle 101 laterally travel (i.e., steer the vehicle 101) between a current time t and the time $T_{ReachLon}$ to achieve a distance $$D = \frac{1}{2} (Targ_{length} + H_{width}) - L_{LatRel}(t + T_{ReachLon}).$$

The steering threat number to achieve the steering-to-rear intervention can be expressed by:

$$STN_{Rear} = \quad (1)$$

$$\min\left(\frac{2 * \max\left(\frac{1}{2}(Targ_{length} + H_{width}) - L_{LatRel}(t + T_{ReachLon}), 0\right)}{T_{ReachLon}^2} * \frac{1}{a_{MaxLatHost}}, 1\right)$$

Figure 6C:
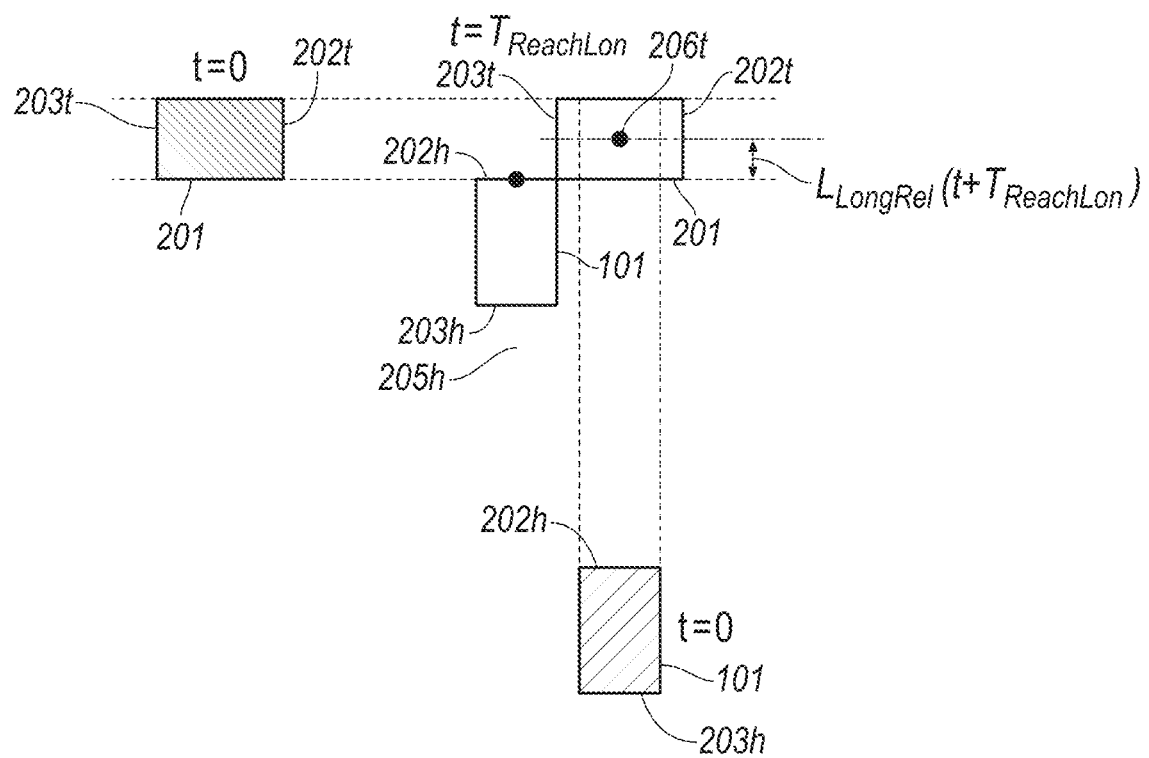

The computer 105 can be programmed to then steer the vehicle 101 to achieve the specified lateral acceleration $STN_{Rear}$, and/or a user can be advised via the vehicle 101 HMI to perform such steering. FIG. 6C illustrates respective positions of host and target vehicles 101, 102 after a steering-to-rear intervention has been performed (and assuming an ideal calculation, i.e., without any margin or distance between the vehicles 101, 102 as they pass each other).

4. Steering-to-Front Intervention.

A second example intervention is a steering-to-front intervention in which the computer 105 steers the host vehicle 101 so that the host vehicle 101 path passes ahead of the target vehicle 201 front 202t. The steering-to-front intervention is performed when the following condition is met:

$$L_{LatRel}(t + T_{ClearLon}) > -\frac{1}{2}(Targ_{length} + H_{width}). \quad (16)$$

Figure 7A:
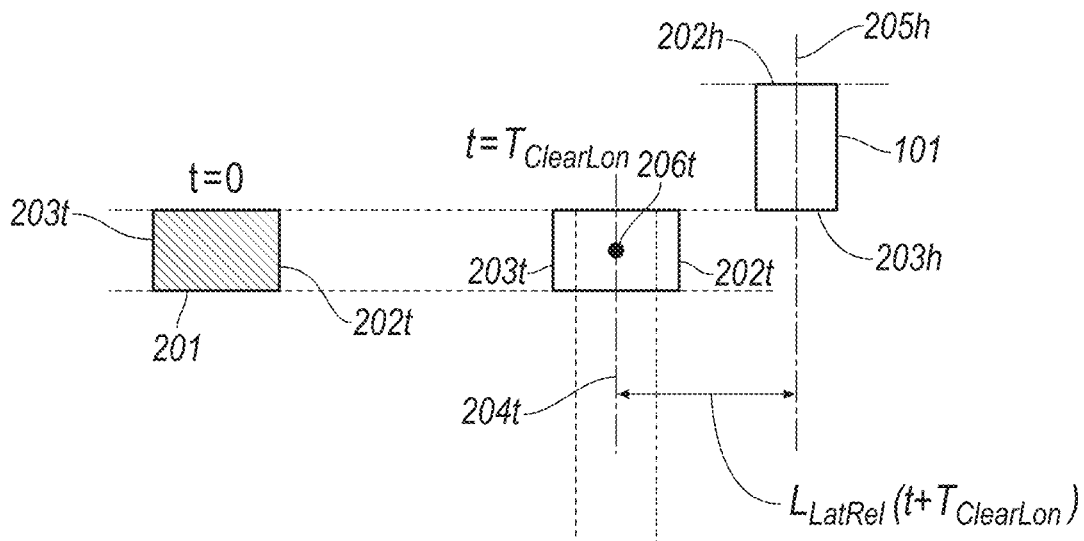
FIGS. 7A-7C illustrate the predicted positions of host and target vehicle at time to clear the host path along longitudinal direction
Figure 7B:
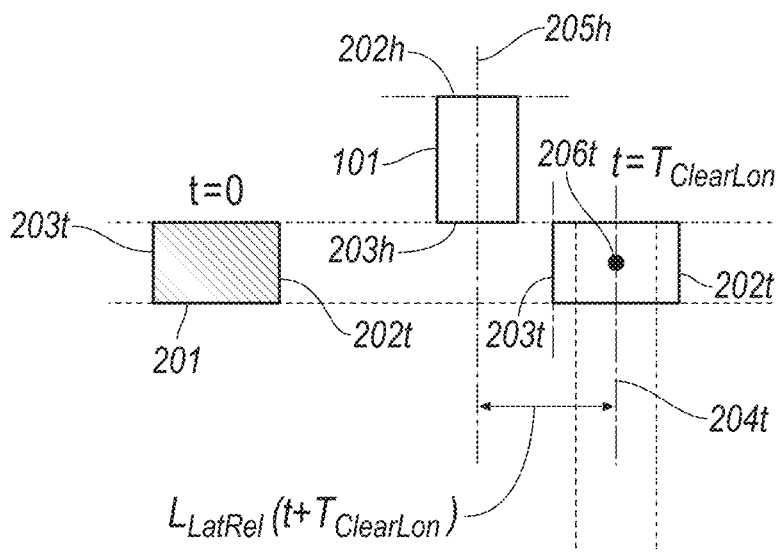

FIGS. 7A and 7B illustrate different scenarios, i.e., examples in which the condition of (16) is false and true, respectively, for a value for $L_{LatRel}(t+T_{TClearLon})$, i.e., a lateral distance between vehicles 101, 201 at a time $t+T_{TClearLon}$.

$T_{ClearLon}$, is time t at which the target vehicle 201 is predicted to clear, i.e., travel past the collision zone 211 without intersecting the host vehicle 101. Put another way, $T_{ClearLon}$ is the time when the host vehicle 101 just clears the path of the target vehicle 201 in the longitudinal direction, i.e. the relative longitudinal distance between target and host vehicle 101, 201 is $$L_{LonRel}(t+T) = -\frac{1}{2}(Targ_{Width}) - H_{Length} \quad (2)$$

Substituting the right-hand side of (17) into (4), given above, we obtain:

$$-\frac{1}{2}(Targ_{Width}) - H_{Length} = \frac{1}{8} a_{LongHost}(t) \dot{\psi}_{Host}(t)^2 * T^4 + \quad (18)$$

$$\frac{1}{6} v_{LongHost}(t) \dot{\psi}_{Host}(t)^2 * T^3 + \frac{1}{2}(a_{LongTrgt}(t) - a_{LongHost}(t)) * T^2 +$$

$$(v_{LongTrgt}(t) - v_{LongHost}(t)) * T + L_{LongRel}(t)$$

The time $T_{ClearLon}$ can be determined by denoting the smallest positive real root of T obtained from (17) as $T_{ClearLon}$. Then, letting $T=T_{ClearLon}$ in equation (4) above, $L_{latRel}(t+T_{ClearLon})$ can be determined so that the condition set forth in (16) above can be evaluated to determine whether to perform a steering-to-front intervention. If a steering-to-front intervention is to be performed, the computer 105 can calculate lateral acceleration needed to increase vehicle 101 laterally travel (i.e., steer the vehicle 101) between a current time t and the time $T_{ReachLon}$ to achieve a distance $$D = \frac{1}{2}(Targ_{length} + H_{width}) - L_{LatRel}(t + T_{ReachLon}).$$

The steer threat number to achieve the steering-to-front intervention can be expressed by:

$$STN_{Front} = \quad (3)$$

$$\min\left(\frac{2 * \max\left(L_{LatRel}(t + T_{ClearLon}) + \frac{1}{2}(Targ_{length} + H_{width}), 0\right)}{T_{ClearLon}^2} * \frac{1}{a_{MaxLatHost}}, 1\right)$$

Figure 7C:
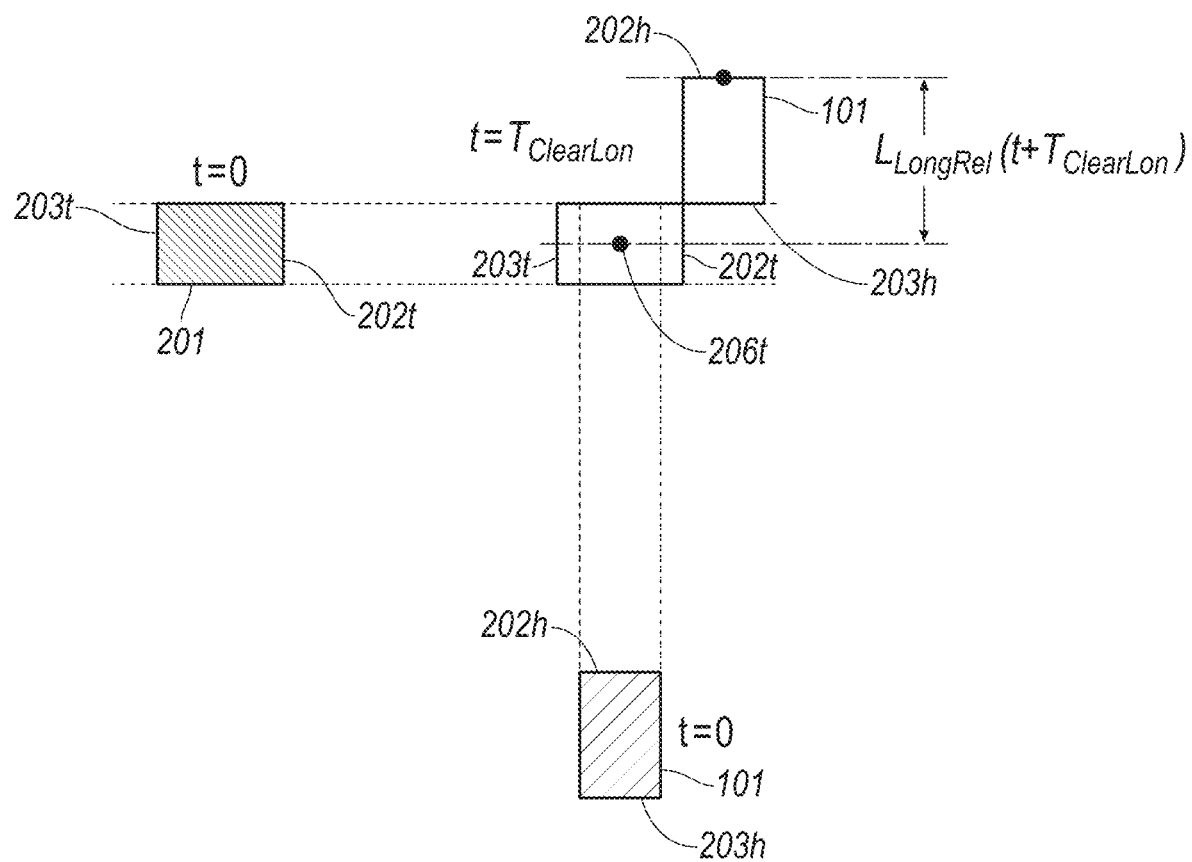

The computer 105 can be programmed to then steer the vehicle 101 to achieve the specified lateral acceleration $STN_{Front}$, and/or a user can be advised via the vehicle 101 HMI to perform such steering. FIG. 7C illustrates respective positions of host and target vehicles 101, 102 after a steering-to-front intervention has been performed (and assuming an ideal calculation, i.e., without any margin or distance between the vehicles 101, 102 as they pass each other).

Processing

Figure 3:
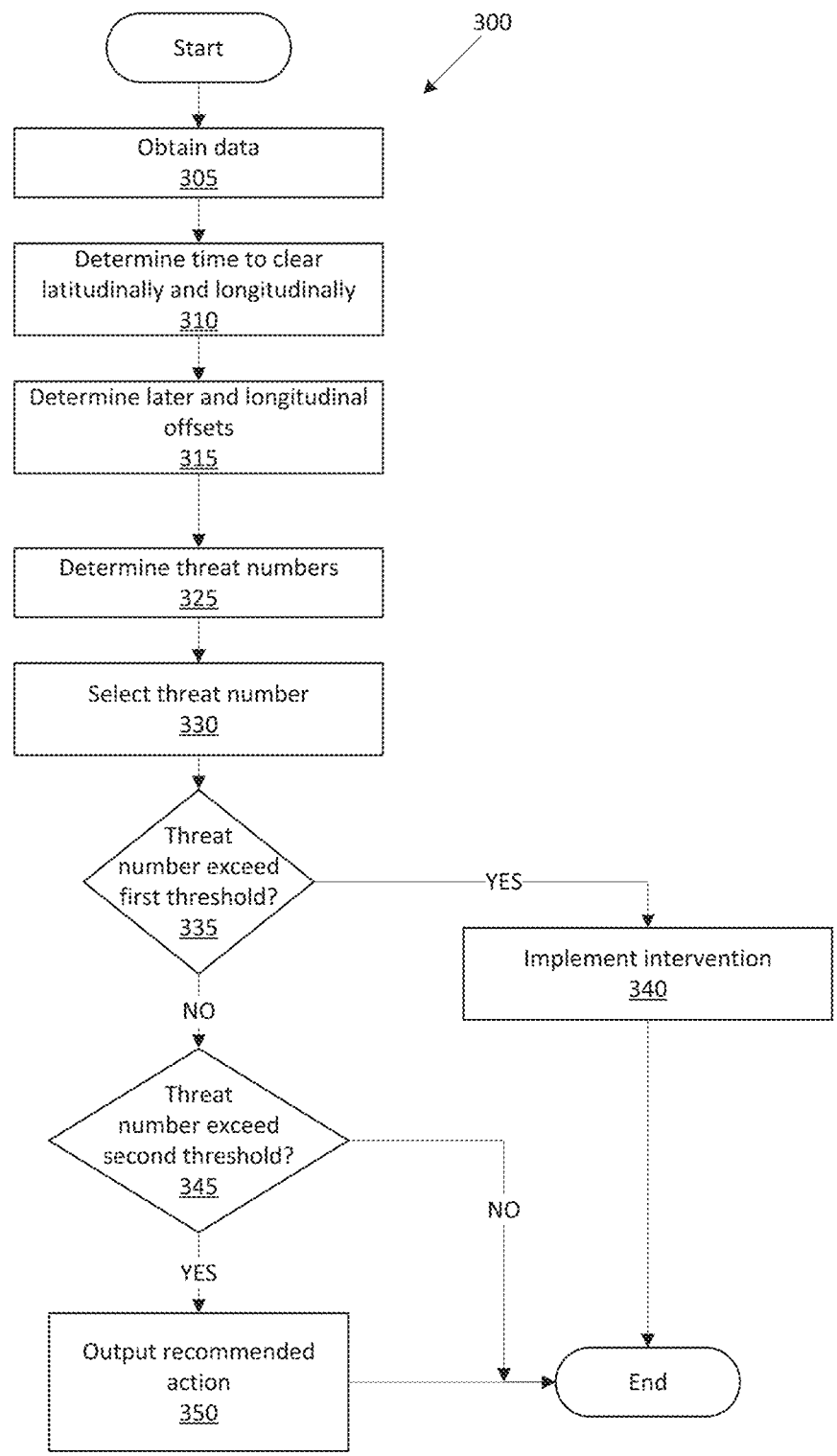
FIG. 3 illustrates an exemplary process for actuating a vehicle component based on a threat number.

FIG. 3 illustrates an exemplary process 300 for actuating a vehicle 101 component or subsystem 107 based on a threat number. The process 300, blocks of which can be executed in an order different than that described herein and/or can be executed in combination with other processing, and/or by omitting certain processing described herein, can be executed by programming in a computer 105.

The process 300 begins in a block 305, in which the computer 105 identifies a target vehicle 201, e.g., based on sensor 110 data. Further, the computer 105 obtains host and target vehicle 101, 102 at a current time t. For example, based on sensor 110 data, the computer 105 determines dimensions (e.g., length and width) of the target vehicle 201, relative longitudinal and lateral distances between the host vehicle 101 and the target vehicle 201, a speed, an acceleration and a heading angle for the target vehicle 201, as well as dimensions of the host vehicle 105, and also a speed, an acceleration and a heading for the host vehicle 101.

Next, in a block 310, the computer 105 determines a time Tat which the target vehicle 102 will clear the path of the host vehicle 101 in both the lateral and longitudinal directions (e.g., as shown in FIG. 2B).

Next, in a block 315, the computer 105 determines predicted respective lateral and longitudinal distances (sometimes referred to as offsets) between the vehicles 101, 102 at the time T.

Next, in the block 325, the computer 105 determines the $ATN_{accel}$, $ATN_{decl}$, the $STN_{front}$ and $STN_{rear}$, each of which can be determined as explained above.

Next, in a block 330, the computer 105 determines the TN, e.g., by selecting a lowest of the $ATN_{accel}$, $ATN_{decl}$, the $STN_{front}$ and $STN_{rear}$. In general, each of the threat numbers quantifies a difficulty or possibility of taking an action, e.g., accelerating, decelerating, steering, to avoid a collision. For example, $ATN_{accel}$ represents a ratio of needed acceleration to maximum possible acceleration for a vehicle 101 to avoid a collision by accelerating; $STN_{rear}$ represents, to provide another example, how the vehicle 101 could steer behind a target vehicle 102 to avoid a collision. A lowest value is taken as the TN because the lowest value represents an easiest way for a human user to take action to avoid a collision. When threat numbers are higher, a level of difficulty for avoiding a collision is higher. For example, as described in the next block, when the TN is above a specified threshold, this means that a difficulty of avoiding a collision is very high or highest, and the vehicle 101 needs to implement immediate breaking or other collision avoidance without allowing intervention of a human driver.

Next, in a decision block 335, the computer 105 determines whether the TN is above a first specified threshold, e.g., 0.7 in one implementation. The first threshold is specified to provide for situations where a human user or operator is unlikely to be able to take action to avoid a collision. If so, the computer 105 may implement an intervention in a block 340, e.g., some collision avoidance protocol such as braking, steering, and/or accelerating, e.g., according to the selected threat number and the process 300 then ends. Otherwise, the process 300 proceeds to a block 345.

In the block 345. the computer 105 determines whether the TN is above a second specified threshold, e.g., 0.5 in one implementation. The second threshold is specified to provide for situations where a human user or operator may be able to take action to avoid a collision, and a collision is not likely to be so imminent as to require an immediate intervention. If the second threshold is exceeded, the process 300 proceeds to a block 350. Otherwise, the process 300 ends following the block 345.

In the block 350, the computer 105 notifies a user or occupant of recommended action to avoid a collision, e.g., steering, braking, or accelerating, according to the selected threat number. For example, a vehicle 101 HMI could output a suggestion to brake and/or steer the vehicle 101 according to a determined threat number.

Following the block 350, the process 300 ends.

CONCLUSION

As used herein, the term "substantially" means that a shape, structure, measurement, value, calculation, etc. may deviate from an exact described geometry, distance, measurement, value, calculation, etc., because of imperfections in materials, machining, manufacturing, data collector measurements, computations, processing time, communications time, etc.

Computers 105 generally each include instructions executable by one or more computing devices such as those identified above, and for carrying out blocks or steps of processes described above. Computer executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in the computer 105 is generally a collection of data stored on a computer readable medium, such as a storage medium, a random access memory, etc.

A computer readable medium includes any medium that participates in providing data (e.g., instructions), which may be read by a computer. Such a medium may take many forms, including, but not limited to, non volatile media, volatile media, etc. Non volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 400, one or more of the steps could be omitted, or the steps could be executed in a different order than shown. In other words, the descriptions of systems and/or processes herein are provided for the purpose of illustrating certain embodiments, and should in no way be construed so as to limit the disclosed subject matter.

The article "a" modifying a noun should be understood as meaning one or more unless stated otherwise, or context requires otherwise. The phrase "based on" encompasses being partly or entirely based on.

The statement that a first thing is "based on" a second thing means that the first thing is based either entirely or partly on the second thing, i.e., at least in part on the second thing, unless explicitly specified otherwise.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A method, comprising:
determining, in a host vehicle, respective dimensions of a target and the host vehicle, and a heading angle of the host vehicle;
determining a predicted longitudinal distance between the host vehicle and a predicted lateral distance between the host vehicle and the target vehicle;
based on the respective dimensions of the target and host vehicles, the heading angle of the host vehicle, and the predicted longitudinal and lateral distances between the host and target vehicle, predicting a plurality of times to collision, including at least two of a first time $T_{ReachLong}$ at which the target vehicle is predicted to reach a longitudinal axis of the host vehicle, a second time $T_{ReachLat}$ at which the target vehicle is predicted to reach a lateral axis of the host vehicle, a third time $T_{ClearLong}$ at which the target vehicle is predicted to clear the host vehicle longitudinal axis, and a fourth time $T_{ClearLat}$ at which the target vehicle is predicted to clear the host vehicle lateral axis;
based on the dimensions, and the at least two of the plurality of predicted times to collision, determining a general threat number including at least one of an acceleration threat number that is a longitudinal acceleration for the host vehicle to pass ahead of or behind the target vehicle, and a steering threat number that is a lateral acceleration for the host vehicle to pass ahead of or behind the target vehicle; and
actuating a host vehicle subsystem based on the general threat number.

2. The method of claim 1, further comprising determining the general threat number based on a heading angle of the target.

3. The method of claim 1, wherein the general threat number is based on at least one of an acceleration threat number or a steering threat number.

4. The method of claim 3, wherein the general threat number is a minimum of the acceleration threat number and the steering threat number.

5. The method of claim 1, wherein actuating the host vehicle subsystem is further based on a specified distance margin.

6. The method of claim 1, wherein the vehicle subsystem includes one or more of a brake subsystem, a steering subsystem, and a propulsion subsystem.

7. A system, comprising a computer that includes a processor and a memory, the memory storing instructions such that the processor is programmed to:
determine, in a host vehicle, respective dimensions of a target and the host vehicle, and a heading angle of the host vehicle; and
determine a predicted longitudinal distance between the host vehicle and a predicted lateral distance between the host vehicle and the target vehicle;
based on the respective dimensions of the target and host vehicles, the heading angle of the host vehicle, and the predicted longitudinal and lateral distances between the host and target vehicle, predict a plurality of times to collision, including at least two of a first time $T_{ReachLong}$ at which the target vehicle is predicted to reach a longitudinal axis of the host vehicle, a second time $T_{ReachLat}$ at which the target vehicle is predicted to reach a lateral axis of the host vehicle, a third time $T_{ClearLong}$ at which the target vehicle is predicted to clear the host vehicle longitudinal axis, and a fourth time $T_{ClearLat}$ at which the target vehicle is predicted to clear the host vehicle lateral axis;
based on the dimensions, and the at least two of the plurality of predicted times to collision, determine a general threat number including at least one of an acceleration threat number that is a longitudinal acceleration for the host vehicle to pass ahead of or behind the target vehicle, and a steering threat number that is a lateral acceleration for the host vehicle to pass ahead of or behind the target vehicle; and
actuate a host vehicle subsystem based on the general threat number.

8. The system of claim 7, the instructions further comprising to determine the threat number based on a heading angle of the target.

9. The system of claim 7, wherein the threat number is based on at least one of an acceleration threat number or a steering threat number.

10. The system of claim 7, wherein the threat number is a minimum of the acceleration threat number and the steering threat number.

11. The system of claim 7, wherein actuating the host vehicle subsystem is further based on a specified distance margin.

12. The system of claim 7, wherein the vehicle subsystem includes one or more of a brake subsystem, a steering subsystem, and a propulsion subsystem.

* * * * *